US009364946B2

(12) United States Patent
Hohmann et al.

(10) Patent No.: US 9,364,946 B2
(45) Date of Patent: Jun. 14, 2016

(54) LIFTING AND TRANSPORTING DEVICE

(71) Applicants: Jorg Hohmann, Meschede (DE); Frank Hohmann, Warstein (DE)

(72) Inventors: Jorg Hohmann, Meschede (DE); Frank Hohmann, Warstein (DE)

( * ) Notice: Subject to any disclaimer, the term of this patent is extended or adjusted under 35 U.S.C. 154(b) by 481 days.

(21) Appl. No.: 13/874,561

(22) Filed: May 1, 2013

(65) Prior Publication Data

US 2013/0292542 A1  Nov. 7, 2013

(30) Foreign Application Priority Data

May 2, 2012  (DE) .................. 10 2012 009 255

(51) Int. Cl.
| | | |
|---|---|---|
| *B66C 1/00* | (2006.01) | |
| *B25B 29/00* | (2006.01) | |
| *B25B 29/02* | (2006.01) | |
| *B66C 9/04* | (2006.01) | |
| *B66C 23/18* | (2006.01) | |

(Continued)

(52) U.S. Cl.
CPC .................. *B25B 29/00* (2013.01); *B25B 29/02* (2013.01); *B66C 9/04* (2013.01); *B66C 23/18* (2013.01); *B66F 19/00* (2013.01); *B23P 19/067* (2013.01)

(58) Field of Classification Search
CPC ................ B66F 9/06; B66F 9/19; B66F 3/12; B66F 19/00; B66C 23/48; B66C 9/04; B66C 23/18; B25J 9/06; B65B 69/008; A24C 5/356; B65G 65/23; B65G 7/08; B65G 2203/042; E02F 3/4135; B65H 15/02; H01L 21/681; G03G 15/0841; B65F 2240/138; B67B 7/26; B25B 29/00; B25B 29/02; B23P 19/067
See application file for complete search history.

(56) References Cited

U.S. PATENT DOCUMENTS 707,660 A    8/1902  Watlington
3,255,893 A  6/1966  Hainer (Continued)

FOREIGN PATENT DOCUMENTS

JP    H08122479 A    5/1996
JP    2012057690 A   3/2012

OTHER PUBLICATIONS

European Search Report and Search Opinion; Application No. EP13002230; dated Jun. 3, 2015; 6 pages.

(Continued)

*Primary Examiner* — Stephen Vu
(74) *Attorney, Agent, or Firm* — Thomas & Karceski, P.C.

(57) ABSTRACT

A lifting and transporting device for lifting a load and transporting the same transversely to the lifting direction includes a frame (2) which for picking up and lifting a load (15) extends around a load space (13) of specified size and a holder (3) for holding the load (15). The holder (3) is movable in lifting direction (9) relative to the frame (2), and includes a hoist (4) which is attached to the frame (2) transversely to the lifting direction (9) beside the load space (13), and includes a portion (25) extending on the load space side thereof, to which the holder (3) is attached, and which is equipped for lifting and lowering the holder (3) with the load (15) attached thereto. The frame (2) is mounted on a first and a second support bearing (5, 6) whose support directions (5a, 6a) each extend perpendicular to the transport direction (10) and at a specified angle to each other, and which both in lifting direction (9) and perpendicular to the transport direction (10) and to the lifting direction (9) have a distance to each other. The support bearings (5, 6) include sliding members or rollers (32, 38) which can be shifted or rolled off in transport direction (10).

13 Claims, 2 Drawing Sheets

(51) Int. Cl.
   *B66F 19/00* (2006.01)
   *B23P 19/06* (2006.01)

(56) References Cited

U.S. PATENT DOCUMENTS

| | | | |
|---|---|---|---|
| 4,213,727 A * | 7/1980 | Lighthipe, Jr. | B66C 23/48 |
| | | | 414/420 |
| 4,297,923 A | 11/1981 | Specht et al. | |
| 4,883,185 A | 11/1989 | Fujitani et al. | |
| 5,379,814 A * | 1/1995 | Posly | B66F 9/06 |
| | | | 141/351 |
| 5,406,996 A * | 4/1995 | Wagner | B66F 9/06 |
| | | | 141/364 |
| 5,425,614 A * | 6/1995 | Perussi | B66C 23/48 |
| | | | 141/351 |
| 5,582,503 A | 12/1996 | Sandoval | |
| 2009/0304487 A1 | 12/2009 | Gonzalo | |

OTHER PUBLICATIONS

Second German Office Action; Application No. DE 10 2012 009 255.5; dated Aug. 22, 2013; 2 pages.

German Office Action; Application No. 10 2012 009 255.5; dated Feb. 28, 2013; 5 pages.

\* cited by examiner

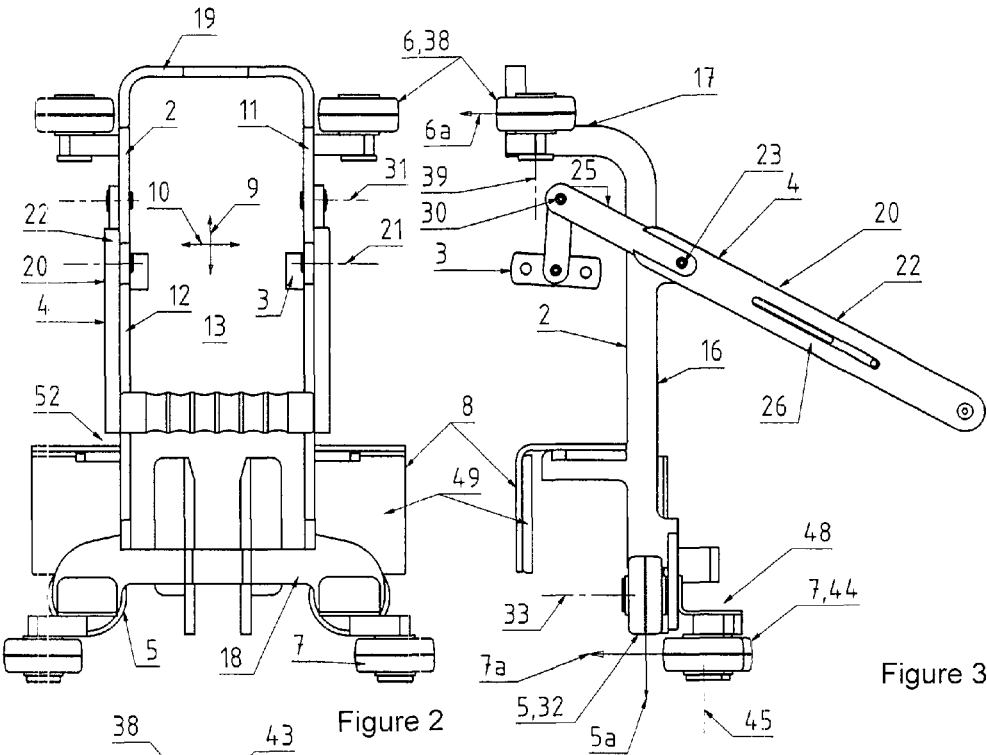
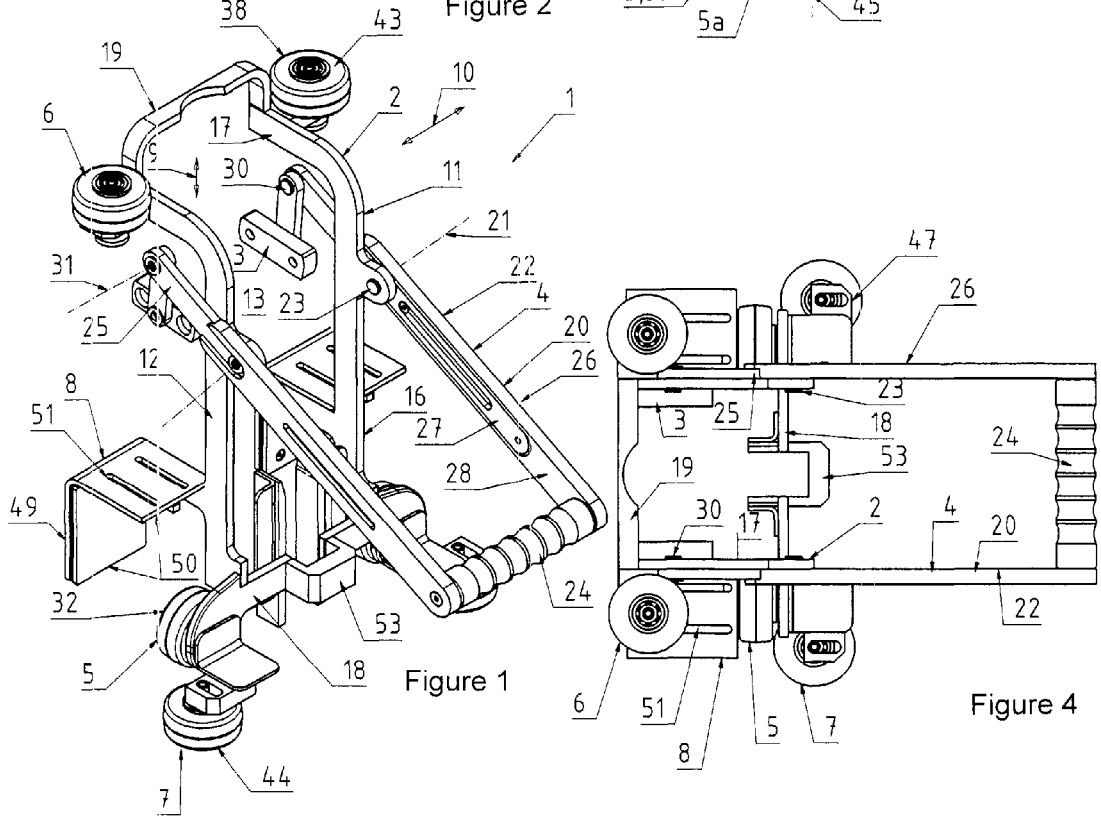

LIFTING AND TRANSPORTING DEVICE

This application claims the priority of German Patent Application No. 10 2012 009 255.5, filed May 2, 2012, which is incorporated by reference herein its entity.

This invention relates to a lifting and transporting device for lifting a load and transporting the same transversely to the lifting direction.

BACKGROUND

When manufacturing pretensioned screw bolt connections, bolt tensioning cylinders frequently are used, in order to apply an exactly defined pretensioning force onto the screw bolts, in particular with large screw bolts from about M16. The screw bolt usually first is put through the aligned through bores in the components to be connected with each other, until the bolt head abuts against the one side of the components to be connected. The screw bolt freely passes through the through bores and with its bolt end protrudes beyond the other side of the components to be connected with each other by a specified measure. Onto this bolt end provided with a thread, a nut is screwed by hand, until it abuts against the component surface. The length of the screw bolt is dimensioned such that in this non-pretensioned condition the bolt end protrudes beyond the nut by a specified length. Onto the bolt end and the nut, a bolt tensioning cylinder now is set, which for example is operated hydraulically and with which the specified pretensioning force is applied onto the screw bolt by lengthening the same. After reaching the specified pretensioning force, the nut is turned down, until it again abuts against the component surface, and then the bolt tensioning cylinder is relieved. Thereafter, the bolt tensioning cylinder is set over to the next screw bolt connection, i.e. to the next screw bolt to be pretensioned.

The connection of the components generally is effected by means of a plurality of individual screw bolt connections. If for example in tank construction cylindrical components are to be screwed together end-to-end, this is usually effected by means of a screwed annular flange connection. From the ends of the cylindrical components, a ring-shaped circumferential flange each radially protrudes to the outside transversely to the cylinder axis, which flanges both are screwed to each other by means of a circumferential row of screw bolt connections. The butt joint and hence the flanges usually extend horizontally, since the components then can be set onto each other without supports transversely to the cylinder axis being required; the bolt ends protrude from the upper side of the flange and the bolt tensioning cylinder correspondingly sits on the upper side of the flange. The working platform for the fitters is arranged such that the flanges lie at waist to chest height of the fitters, so that the same can comfortably mount the screw bolts and nuts in an optimum working posture and also can comfortably actuate the bolt tensioning cylinder. For setting the bolt tensioning cylinder over to the next screw bolt connection, this arrangement however is extremely unfavorable. From a size of M42, the bolt tensioning cylinders have a relatively high weight. The bolt tensioning cylinders either are set over by hand with arms horizontally stretched away from the upper body, which is extremely exhausting. Or a ladder is utilized, in order to be able to grasp the bolt tensioning cylinder from above, which however on the one hand requires the respective fetching and again putting away of the ladder and hence an additional expenditure of time and on the other hand requires a sufficient free space above the bolt tensioning cylinder. What is also conceivable is the use of a crane, which however requires a continuously free space to the top above the screw bolt connections and an extremely high technical expenditure.

SUMMARY

Proceeding therefrom, it is the object underlying the invention to facilitate a shifting of loads, such as implements, in confined space conditions.

In accordance with the invention, this object is solved by an apparatus according to claim 1. With an apparatus according to the invention, loads can be shifted horizontally in a simple and comfortable way with a horizontal access from one side only along walls or generally along supports extending above the load contact surface transversely to the lifting direction. There are not required any auxiliaries or attachment, detachment or restructuring measures. Due to the fact that the hoisting means is attached to the frame beside the load space transversely to the lifting direction, this horizontal access becomes possible from one side only. The term "load space" here is understood to be space which is occupied by the load. With this arrangement of the hoisting means, a manual actuation of the hoisting means in the ergonomically adapted working position is possible, in which the load—e.g. an implement—usually is handled, for example on standing at the height of the upper body. In addition, the arrangement of the hoisting means according to the invention allows the use of the lifting and transporting device with small overall height, since above the load no free space is required for accommodating the hoisting means. According to the invention, the lifting and transporting device is supported on a first and a second support bearing, whose support directions each extend vertically to the transport direction and at a specified angle to each other, whereby the elements beside which the load is standing and which are responsible for the confined space conditions, such as for example a wall, can be utilized as support for the lifting and transporting device. Due to the arrangement of a distance between the support bearings both in lifting direction and vertically to the transport direction and to the lifting direction, the dissipation even of large torques, which possibly occur due to the arrangement of the hoisting means transversely to the lifting direction beside the load space and rotate about an axis of rotation extending in transport direction, is easily possible. By forming sufficiently large distances, horizontal forces in the bearings can be kept relatively small.

Preferably, each support bearing includes two sliding members or two rollers, which are arranged before and behind the load space in transport direction. The risk of tilting in transport direction thereby is reduced considerably. In addition, the individual sliding members or rollers can be dimensioned smaller.

In a favorable development of the invention, the support directions extend vertically to each other. This embodiment is suitable for shifting loads along a wall which vertically protrudes from the load contact surface behind a load. One support bearing preferably abuts against the wall above the load, while the other support bearing on the side of the load facing away from the wall beside the load abuts against the surface in which the load contact surface is located.

In an advantageous aspect of the invention, the hoisting means includes a lever which is pivotally attached to the frame about a first pivot axis which extends perpendicular to the lifting direction, with a first lever portion which extends from the pivot axis on the load space side of the frame and to which the holding means is pivotally attached about a second pivot axis which extends parallel to the first pivot axis, and with a second lever portion which proceeding from the pivot axis extends away from the load space and includes a handle for actuating the lever. With these measures, the hoisting means can be formed constructively simple and also can be actuated very easily. Due to the articulated attachment of the lever to the frame, no bending moment or only a small bending moment resulting from a possible eccentricity between pivot axis and frame axis is introduced into the frame by the load, so that the bending load of the frame is reduced distinctly. In addition, the lever only must be pivoted by means of the handle, in order to lift the load or set it down.

Preferably, the handle extends perpendicular or parallel to the transport direction. In this way, an adaption to the respective space conditions can be made. In addition, the geometry and hence the manufacture of the hoisting means thereby is further simplified.

Advantageously, the second lever portion is telescopable. In this way, the position of the handle relative to the frame and hence the lever arm length from the handle to the pivot axis at the frame can be adjusted with regard to an actuation of the hoisting means as comfortable as possible, and this in a fast and simple way.

In a preferred embodiment of the invention, the frame includes two identical frame parts which are arranged before and behind the load space in transport direction. With these measures, the load space is accessible from above, so that for example an implement can be connected to a control means or supply means on its upper side, and the connecting lines are guided out of the load space and into the same, respectively between the two frame parts.

Preferably the frame is formed L-shaped perpendicular to the transport direction and the support bearings are arranged at the free ends of the L. In this case, height and width of the lifting and transporting device can be specified merely via a suitable dimensioning of the leg lengths of the L. The manufacture of the lifting and transporting device is simplified considerably with such a formation.

When the frame includes two or more identical L-shaped frame parts, a roller or a sliding member advantageously is arranged at each free end of the L-shaped frame parts. In this way, a rather uniform load distribution is achieved with rather small dimensions of the rollers or sliding members.

Preferably, the long leg of the L extends in lifting direction and the pivot bearing for the lever and the first support bearing is attached to the same, wherein its support direction extends in lifting direction. Due to the fact that the pivot bearing for the lever is attached to the leg of the L extending in lifting direction, this leg hardly is subjected to a bending moment as a result of the load—at best by an eccentricity moment due to a possible distance of the pivot axis from the longitudinal leg axis, but for the most part by far by a longitudinal force in direction of the longitudinal axis of this leg. When this leg in addition is the long leg of the L, sufficient space is available for attachment of the pivot bearing.

Preferably, the second support bearing is arranged at the end of the short leg of the L, and a third support bearing, whose support direction is the same as that of the second support bearing, is arranged at the end of the long leg of the L. With this measure, a support bearing pair is created by the second and the third support bearing, with which torques about the transport direction can be absorbed in both directions of rotation.

In a lifting and transporting device which is used when manufacturing a screwed flange connection, in order to lift a bolt tensioning cylinder from a screw bolt connection and transport the same to the next screw bolt connection, wherein the flange extends horizontally, the first support bearing is designed for abutment against the upper side of the flange between screw bolt connection and flange edge, and the second support bearing is designed for abutment against a component wall proceeding from the flange above the screw bolt connection. Such lifting and transporting device easily can be set onto the upper side of the flange around the screw bolt connection and bolt tensioning cylinder by a fitter from the side of the flange edge. The holding means is attached to the bolt tensioning cylinder and can remain fixed there during the pretensioning of the screw bolt. After pretensioning of the screw bolt is terminated with this screw bolt connection, the bolt tensioning cylinder can be lifted from the screw bolt end and the screw nut by means of the hoisting means proceeding from the flange edge to such an extent that the lower edge of the bolt tensioning cylinder lies above the upper edge of the screw bolt end. The lifting and transporting device with the bolt tensioning cylinder attached to the same now is moved by means of the sliding members or rollers of the support bearings to the adjacent screw bolt connection yet to be pretensioned. There, the bolt tensioning cylinder again is set down onto the screw bolt end and the screw nut by means of the hoisting means. This shifting is effected in the same working position or posture in which the screw bolts also are inserted into the through bores of the flange connection and the screw nuts are screwed onto the same by hand. The expenditure of force for shifting the bolt tensioning cylinder is very low, since merely the hoisting means must be actuated and the lifting and transporting device must be shifted.

Preferably, the third support bearing is designed for abutment against the end face of the flange. The tilt stability thereby is further increased, without any space being required for this on the upper side of the flange.

Preferably, the lifting and transporting device includes an auxiliary support bearing, which is arranged before and behind the load space in transport direction and is attached to the frame and formed for engaging behind the adjacent screw bolt connections. With this measure, an inadvertent slipping down or falling down of the lifting and transporting device from the upper side of the flange is prevented.

BRIEF DESCRIPTION OF THE DRAWINGS

The invention will subsequently be explained in greater detail by way of example with reference to the drawings, in which:

FIG. 1 shows a perspective view of an embodiment of a lifting and transporting device according to the invention, which is employed when manufacturing a screwed flange connection;

FIG. 2 shows a front view of the lifting and transporting device of FIG. 1;

FIG. 3 shows a side view of the lifting and transporting device of FIG. 1;

FIG. 4 shows a top view of the lifting and transporting device of FIG. 1;

Figure 5:
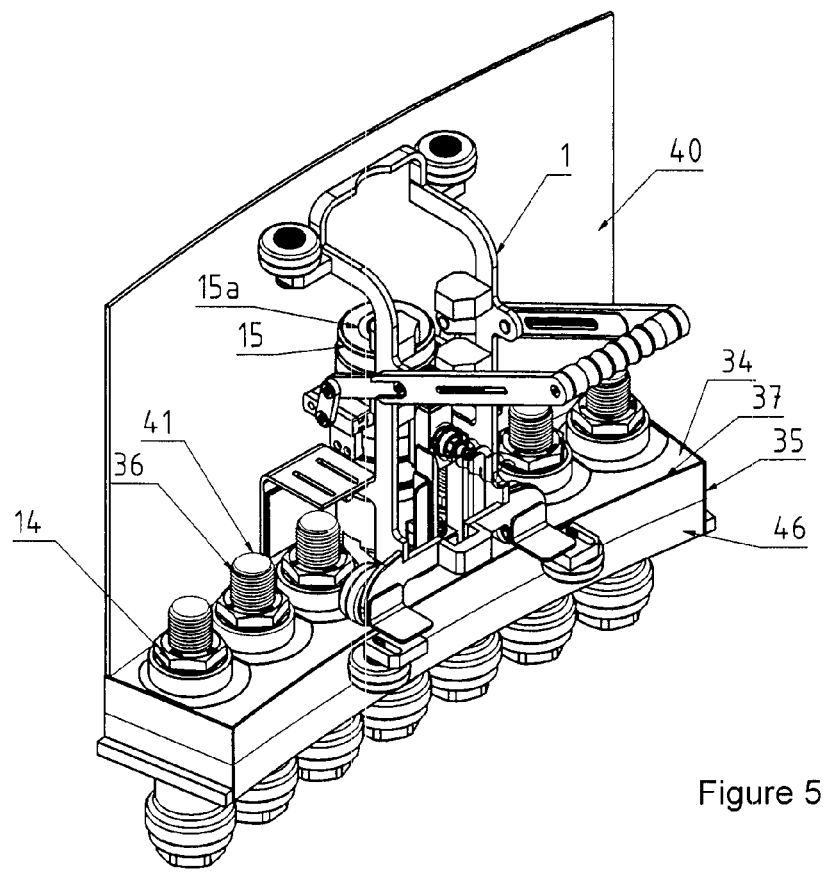
FIG. 5 shows a perspective view of the lifting and transporting device of FIG. 1, used when manufacturing a screwed flange connection.

Subsequently, the invention will be described with reference to the use together with a bolt tensioning cylinder. By simple constructive changes, however, a lifting and transporting device according to the invention can be used for any other automatic or manual tool.

DETAILED DESCRIPTION

The embodiment of a lifting and transporting device 1 according to the invention as shown in the Figures includes a frame 2, a holding means 3, a hoisting means 4, first, second and third support bearings 5, 6, 7 as well as an auxiliary support bearing 8. The lifting direction is designated with 9 and the transport direction with 10.

Figure 6:
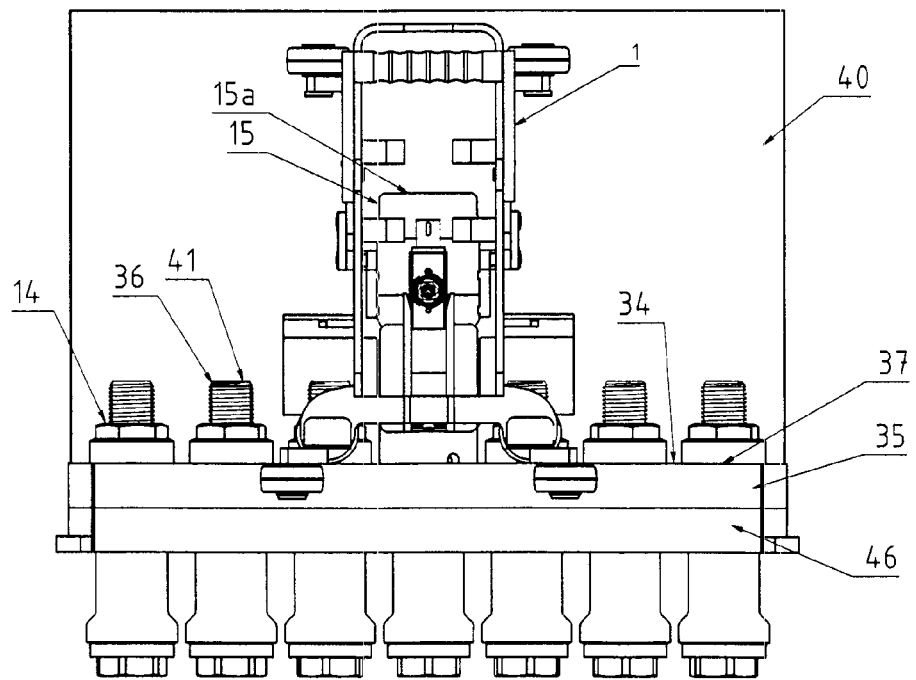
FIG. 6 shows a front view to the perspective view in FIG. 5.

The frame 2 is formed of two L-shaped frame parts 11, 12 which are arranged before and behind a load space 13 in transport direction 10 and extend beside and above the load space 13 perpendicular to the transport direction 10. In the illustrated exemplary embodiment, the clear distance between the two frame parts 11, 12 is designed for accommodating a screw nut 14 and a bolt tensioning cylinder 15 set onto the same (FIGS. 5 and 6). The long leg 16 of the L extends in vertical direction beyond the upper side 15a of the bolt tensioning cylinder 15 to be accommodated. The short leg 17 of the L extends horizontally above the upper side 15a of the bolt tensioning cylinder 15 to be accommodated. The free ends of the two long L legs 16 are connected with each other by a lower cross bar 18 and the free ends of the two short L legs 17 are connected with each other by an upper cross bar 19.

In the upper end region of the long L legs 16, a lever 20 is pivotally mounted about a first pivot axis 21 as hoisting means 4. The lever 20 is formed U-shaped, wherein each leg 22 of the U extends perpendicular to the transport direction 10 and is attached to one of the long L legs 16 by means of a first pivot bearing 23. The base of the U is formed by a handle 24 with which the lever 20 can be actuated.

Each leg 22 of the U includes a first lever portion 25, which extends from the pivot bearing 23 towards the load space side, and a second lever portion 26, which extends from the pivot bearing 23 towards the side facing away from the load space 13 and at whose free end the handle 24 is attached.

The second lever portions 26 in turn each are formed of two parts 27, 28, which are shiftable against each other in longitudinal direction of the second lever portions 26, so that the second lever portions 26 are formed as telescope and are variable in their length.

Each second lever portion 26 has a first locking means (not shown) with which it can be locked in the desired length, i.e. with which the two parts 27, 28 of each second lever portion 26 can be locked in place in a desired condition shifted relative to each other.

At the free ends of the first lever portions 25 a holder 3 each is mounted, which can be attached to a bolt tensioning cylinder 15. The holders 3 are mounted in the first lever portions 25 each by means of a second pivot bearing 30, whose (second) pivot axis 31 extends parallel to the first pivot axis 21.

At the two ends of the lower cross bar 18, a first roller 32 each is rotatably attached, whose axis of rotation 33 extends horizontally and perpendicular to the transport direction 10. Both rollers 32 together form a first roller pair. It is designed for abutment against the upper side 34 of a flange 35 (FIGS. 5 and 6) and forms the first support bearing 5. Its support direction 5a extends perpendicular to the transport direction 10 in lifting direction 9. These rollers 32 rest against the upper side 34 of the flange 35 between the screw bolt connections 36 and the flange edge 37, so that when rolling on to the adjacent screw bolt connection 36 they can roll off between the screw nuts 14 and the flange edge 37.

At the free ends of the two short L legs 17 a second roller 38 each is rotatably mounted about an axis of rotation 39, which extends vertically and at right angles to the transport direction 10. Together, they form a second roller pair. It is designed for horizontal abutment against a component wall 40 proceeding perpendicular from the flange 35 (FIGS. 5 and 6) and forms the second support bearing 6. Its support direction 6a extends perpendicular to the transport direction 10 and perpendicular to the lifting direction 9, i.e. perpendicular to the support direction 5a. The rollers 38 rest against the component wall 40 above the end of the screw bolt 41 and thus can unimpededly roll off on the component wall 40 in transport direction 10. Transversely to the transport direction 10, the second rollers 38 are horizontally shiftable by a specified measure in one oblong hole each, in order to ensure a safe abutment against the component wall 40. By means of a second locking device (not shown), they can be locked in place in their desired horizontal position.

The first and the second roller pair, i.e. the first and the second support bearing 5, 6 have a distance to each other in lifting direction 9 which substantially corresponds to the length of the long L legs 16. Their distance perpendicular to the transport direction 10 and to the lifting direction 9 substantially corresponds to the length of the short L legs 17.

Furthermore, at the two ends of the lower cross bar 18, a third roller 44 each is rotatably attached, whose axis of rotation 45 extends vertically and at right angles to the transport direction 10. This third roller pair is designed for horizontal abutment against the flange end face 46 (FIGS. 5 and 6) and forms the third support bearing 7. Its support direction 7a extends parallel to the support direction 6a of the second support bearing 6. These rollers 44 also are horizontally shiftable transversely to the transport direction 10 in one oblong hole 47 each, in order to ensure an abutment against the flange end face 46. By means of a third locking device (not shown), they can be locked in place in their desired horizontal position.

At the long L legs 16, between the first pivot bearing 23 and their lower end an auxiliary support bearing 8 each is attached in addition, which is designed for engaging behind the screw bolt connections 36 which are adjacent to the screw bolt to be pretensioned. These auxiliary support bearings 8 are formed in the form of a right angle 49 with legs 50 of approximately the same length in the illustrated case. In their horizontal position, the auxiliary support bearings 8 each are adjustable in an oblong hole 51, in order to ensure a safe abutment against the adjacent screw bolt connections 36. In their desired horizontal position, they can be locked in place by means of a fourth locking device (not shown).

In its longitudinal direction, the lower cross bar 18 centrally includes a U-shaped bulge 53 open towards the load space 13, through which a tool can be guided, in order to turn the screw nut 14 down in the lengthened condition of the screw bolt 41, until the screw nut 14 rests against the upper side 34 of the flange 35.

In FIGS. 5 and 6, the lifting and transporting device 1 of FIGS. 1 to 4 is shown in use during the manufacture of a screwed flange connection, wherein here only the upper flange 35 is shown. A bolt tensioning cylinder 15 sits on the upper side 34 of the flange 35 and on the screw nut 14 and is in working engagement with the end region of the screw bolt 41. The two L-shaped frame parts 11, 12 are arranged on both sides of the bolt tensioning cylinder 15 in transport direction 10. The first, second and third roller pair 5, 6, 7 abuts against the upper side 34 of the flange 35, against the component wall 40 and against the flange end face 46, respectively. The two auxiliary support bearings 8 engage behind the screw bolt connections 36 adjacent to the screw bolt 41 to be pretensioned. The holding means 3 is attached to the bolt tensioning cylinder 15 and the lever handle 24 is in its upper position.

The screw bolt 41 now is pretensioned. After termination of the tensioning operation, the bolt tensioning cylinder 15 is released from the bolt end, the lever handle 24 is pulled down and the holding means 3 and the bolt tensioning cylinder 15 attached to the same hence is moved upwards to such an extent that the lower edge of the bolt tensioning cylinder 15 lies above the screw bolt end. The lifting and transporting device 1 and with it the bolt tensioning cylinder 15 now can freely be shifted or rolled to the next screw bolt connection 36 and there the bolt tensioning cylinder 15 can be set onto the screw nut 14, in that the handle 24 of the lever 20 is moved upwards.

While the invention has been described with reference to specific embodiments thereof, it will be understood that numerous variations, modifications and additional embodiments are possible, and accordingly, all such variations, modifications, and embodiments are to be regarded as being within the spirit and scope of the invention.

What is claimed is:

1. A lifting and transporting device for lifting a load in a lifting direction and transporting the load in a transport direction transversely to the lifting direction, comprising:
   a frame which for picking up and lifting a load extends around a load space of specified size,
   a holding means for holding the load, wherein the holding means is movable in lifting direction relative to the frame, and comprising:
   a hoisting device which is attached to the frame transversely to the lifting direction beside the load space, includes a portion extending on a load space side of said frame, to which the holder is attached, and which is equipped for lifting and lowering the holder with the load attached thereto,
   wherein the frame is mounted on a first and a second support bearing, whose support directions extend perpendicular to each other and each extend perpendicular to the transport direction, and which both in lifting direction and perpendicular to the transport direction and to the lifting direction have a distance to each other, and
   wherein the support bearings include sliding members or rollers which can be shifted or rolled off in transport direction.

2. The lifting and transporting device according to claim 1, wherein each support bearing includes two sliding members or two rollers which are arranged before and behind the load space in transport direction.

3. The lifting and transporting device according to claim 1, wherein the hoisting device includes a lever which is pivotally attached to the frame about a first pivot axis which extends perpendicular to the lifting direction, with a first lever portion which extends from the pivot axis on the load space side of the frame and to which the holder is pivotally attached about a second pivot axis which extends parallel to the first pivot axis, and with a second lever portion which proceeding from the first pivot axis extends away from the load space and includes a handle for actuating the lever.

4. The lifting and transporting device according to claim 3, wherein the lever extends perpendicular or parallel to the transport direction.

5. The lifting and transporting device according to claim 3, wherein the second lever portion is telescopable.

6. The lifting and transporting device according to claim 1, wherein the frame includes two identical frame parts which are arranged before and behind the load space in transport direction.

7. The lifting and transporting device according to claim 1, wherein the frame is L-shaped and is perpendicular to the transport direction, and the support bearings are arranged at free ends of the L-shaped frame.

8. The lifting and transporting device according to claim 7, wherein at each free end of the L-shaped frame parts a roller or a sliding member is arranged.

9. The lifting and transporting device according to claim 7, wherein the long leg of the L-shaped frame extends in lifting direction and the pivot bearing for the lever as well as the first support bearing is attached to the same, wherein its support direction extends in lifting direction.

10. The lifting and transporting device according to claim 7, wherein the second support bearing is arranged at the end of the short leg of the L-shaped frame and a third support bearing, whose support direction is the same as that of the second support bearing, is arranged at the end of the long leg of the L-shaped frame.

11. The lifting and transporting device according to claim 10, wherein the third support bearing is designed for abutment against a flange end face.

12. The lifting and transporting device according to claim 1 for use in the manufacture of a screwed flange connection, in order to lift a bolt tensioning cylinder from a screw bolt connection and transport the bolt tensioning cylinder to the next screw bolt connection, wherein a flange of the bolt tensioning cylinder extends horizontally, wherein the first support bearing is designed for abutment against the upper side of the flange between screw bolt connection and a flange edge, and the second support bearing is designed for abutment against a component wall proceeding from the flange above the screw bolt connection.

13. The lifting and transporting device according to claim 12, further comprising an auxiliary support bearing which is arranged before and behind the load space in transport direction and is attached to the frame and formed to engage behind the adjacent screw bolt connections.

\* \* \* \* \*